United States Patent
Pirrone

(10) Patent No.: US 7,152,887 B2
(45) Date of Patent: Dec. 26, 2006

(54) DUAL CLAMP ASSEMBLY

(75) Inventor: Douglas Pirrone, Huntingdon, NY (US)

(73) Assignee: Fast Forward Ltd., Huntington, NY (US)

( * ) Notice: Subject to any disclaimer, the term of this patent is extended or adjusted under 35 U.S.C. 154(b) by 0 days.

(21) Appl. No.: 10/962,114

(22) Filed: Oct. 8, 2004

(65) Prior Publication Data

US 2006/0076777 A1 Apr. 13, 2006

(51) Int. Cl.
*F16L 25/00* (2006.01)

(52) U.S. Cl. ....................................... 285/420

(58) Field of Classification Search .................... None
See application file for complete search history.

(56) References Cited

U.S. PATENT DOCUMENTS

| | | | | |
|---|---|---|---|---|
| 911,250 | A | * 2/1909 | Maggio | 285/253 |
| 4,180,286 | A | * 12/1979 | Ginter, Jr. | 285/420 |
| 4,261,600 | A | 4/1981 | Cassel | |
| 4,262,943 | A | * 4/1981 | Armstrong | 285/420 |
| 4,270,251 | A | * 6/1981 | Evans et al. | 285/420 |
| 4,415,188 | A | * 11/1983 | Ginter, Jr. | 285/420 |

* cited by examiner

*Primary Examiner*—David Bochna
(74) *Attorney, Agent, or Firm*—Anderson Kill & Olick, PC

(57) ABSTRACT

A dual clamp assembly consisting of two U-shaped clamps and a welded joint autogenously interconnecting each of the U-shaped clamps forming a single unitary assembly for joining two pipes telescopically fitted into one another to form a lap joint therebetween with each of the U-shaped clamps comprising a U-bolt portion having a horseshoe configuration with open ends extending therefrom and a cradle portion having openings into which the open ends of the U-bolt portion are removably fitted. Each cradle portion of each clamp is spaced apart solely by the welded joint allowing each clamp to be mounted to each of the pipes on opposite sides of the lap joint with the welded joint positioned therebetween and in contact with the lap joint so as to prevent said pipes from being pulled apart.

6 Claims, 3 Drawing Sheets

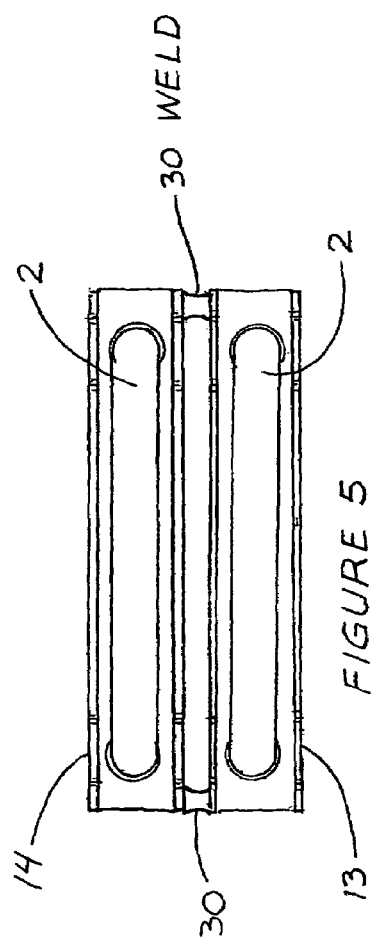
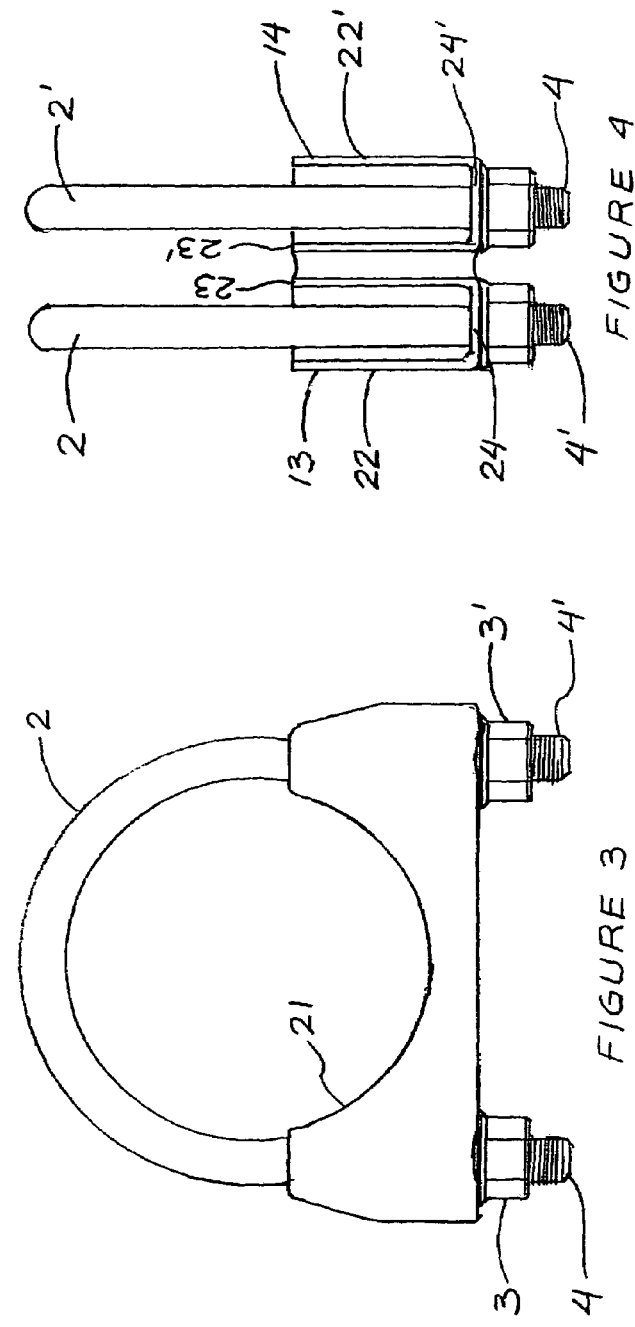

DUAL CLAMP ASSEMBLY

FIELD OF INVENTION

This patent application relates to a clamp assembly for coupling two pipes to one another and more particularly to an inexpensive clamp assembly for coupling two fitted pipes at one end to prevent the pipes from being pulled apart comprising dual clamps integrally welded to one another with each clamp adapted to secure one end of each of the two pipes to be joined on opposite sides of the weld joint so that the weld joint overlies the lap joint.

BACKGROUND OF THE INVENTION

There are many commercially available pipe coupling devices which are conventionally used to join together two pipes which have been telescopically fitted into one another to form a lap joint. The connection at the lap joint formed between the fitted pipes should be mechanically strong enough so that the pipes will not pull apart or twist relative to one another. A single clamp is commonly used to accomplish this by gripping both pipes at the lap joint. More specifically, a single clamp is commonly used to clamp the larger or outside pipe against the smaller or inside pipe. When a single clamp is used, independent of its construction, the two pipes are commonly crimped together at the lap joint to prevent them from pulling apart. This is typically accomplished by over tightening the clamp to create substantial pressure upon the pipes which essentially crushes the pipes into engagement against one another. Unfortunately, by over tightening the clamp, the overlapping segments at the lap joint become somewhat deformed. If the clamp is not crimped, relative rotation between the pipes cannot be prevented. This permits the pipes to pull apart. Once the clamp is over tightened it becomes impossible for the pipes to be disassembled for repair and/or replacement. Moreover, the pipes generally connect into a system such as e.g., a vehicle exhaust system and it becomes impossible to remove worn components from the system without replacing the entire system. In a motor vehicle exhaust system the pipes are fitted telescopically into one another and it is common to remove and replace a failed or damaged pipe with new pipe.

A dual coupling for securing a lap joint between two interconnected pipes to form a fluid tight seal is known in the prior art as is taught for example in U.S. Pat. No. 4,261,600. The dual coupling in this patent is actually a one piece assembly having two circular bands each of a different diameter designed to fit the connecting ends of the two pipes. The diameters of the bands correspond to the diameters of each of the pipes. The bands need to be precisely sized in advance to conform to the exact dimensions of the pipes and cannot be used for universal application.

Although many other pipe coupling devices are known in the prior art, none are formed from two separate U shaped clamps connected together by a welded joint with each clamp having a cradle adapted to fit over adjacent ends of two pipes interconnected to one another to form a lap joint such that continuous points of contact are made with each pipe by each separate U shaped clamp about substantially the entire 360° circumference of each pipe and with the welded joint located over the lap joint. This arrangement restricts relative rotation between the two pipes and prevents the pipes from being laterally pulled apart while at the same time permits the clamping force or pressure applied by each clamp to be substantially reduced or minimized such that deformation of the overlapping pipes at the lap joint is not necessary and thus can be easily avoided.

SUMMARY OF THE INVENTION

The dual clamp assembly of the present invention consists of two U shaped clamps for joining two pipes telescopically fitted into one another to form a lap joint with each of the U-shaped clamps being interconnected by a weld joint and with each clamp comprising a U shaped portion, hereinafter referred to as a "U bolt portion", having a horseshoe configuration with open ends extending therefrom and a cradle portion. The cradle portion has openings or holes into which the extended open ends of the U bolt portion are removably fitted and with the welded joint interconnecting each cradle portion to form a symmetrical unitary assembly such that each U shaped clamp is adapted to be mounted to each of the pipes on adjacent sides of said lap joint with the welded joint positioned therebetween so as to prevent said pipes from being pulled apart.

Each cradle portion has a curved central portion which is preferably semi-circular in shape and concentric to each pipe to enable fitting each U bolt portion into each cradle portion about each pipe on opposite sides of the lap joint such that continuous points of contact are made with each of the pipes by both the cradle portion and the U bolt portion of each clamp in a plane extending traverse of the pipes over substantially or essentially the entire 360° circumference of each pipe. This permits high unit loading with minimal tightening force.

Each cradle portion is formed from a bracket having two sides extending from a base section with the sides arranged to face each other and with each side having a curved central portion in a shape complimentary to the curvature of the clamp with both preferably semi-circular in geometry. The base section has openings through which the U bolt portion of the clamp is fitted. The U bolt portions are secured preferably by threading the open ends and using threaded nuts to engage the threaded ends of each U bolt portion of each clamp.

BRIEF DESCRIPTION OF THE DRAWINGS

Other advantages of the present invention will become apparent from the following detailed description of the invention when read in conjunction with the accompanying drawings of which:

FIG. 3 is an end view of the dual clamp assembly of FIG. 1 when the assembly is oriented in a position so that the cradles lie below the clamps;

FIG. 4 is a side view of the dual clamp assembly of FIG. 1 in the rotated position of FIG. 3 and FIG. 5 is a top view of the dual clamp assembly of FIG. 1 in the rotated position of FIG. 3

DETAILED DESCRIPTION OF THE INVENTION

Figure 1:
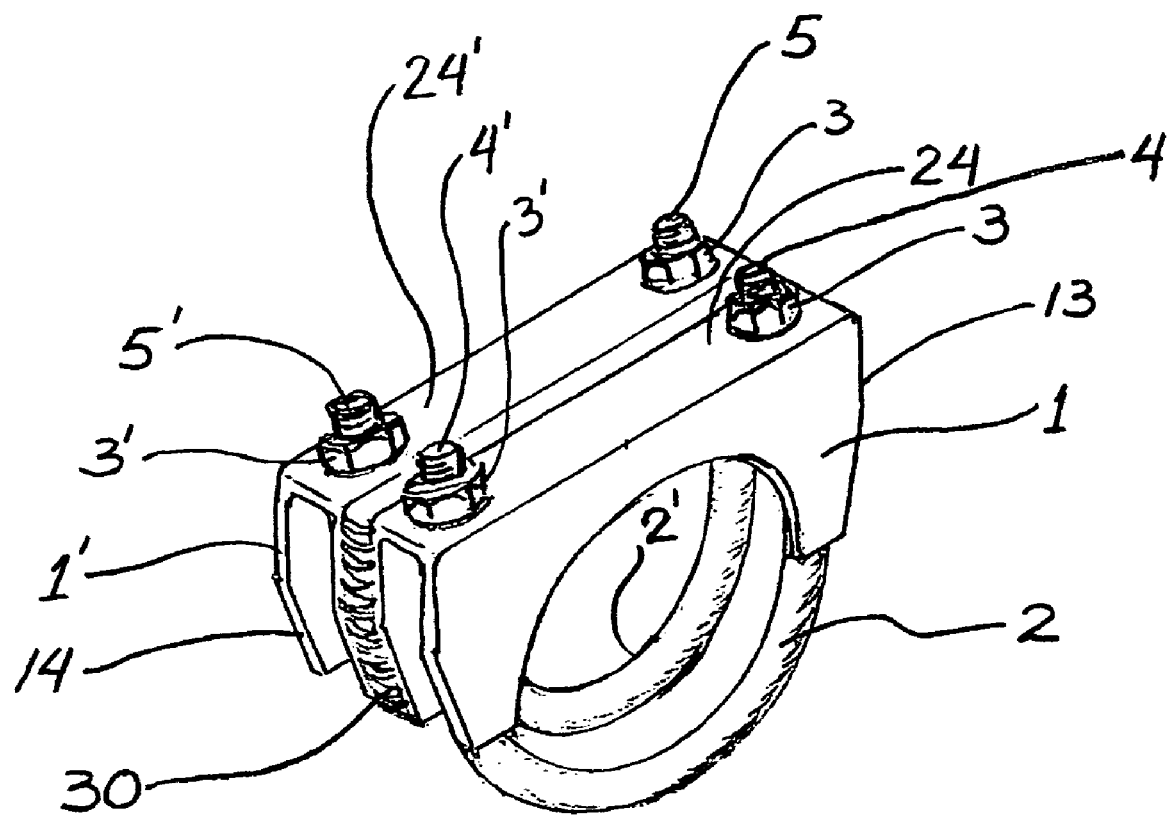
FIG. 1 is a perspective view of the dual clamp assembly of the present invention.
Figure 2:
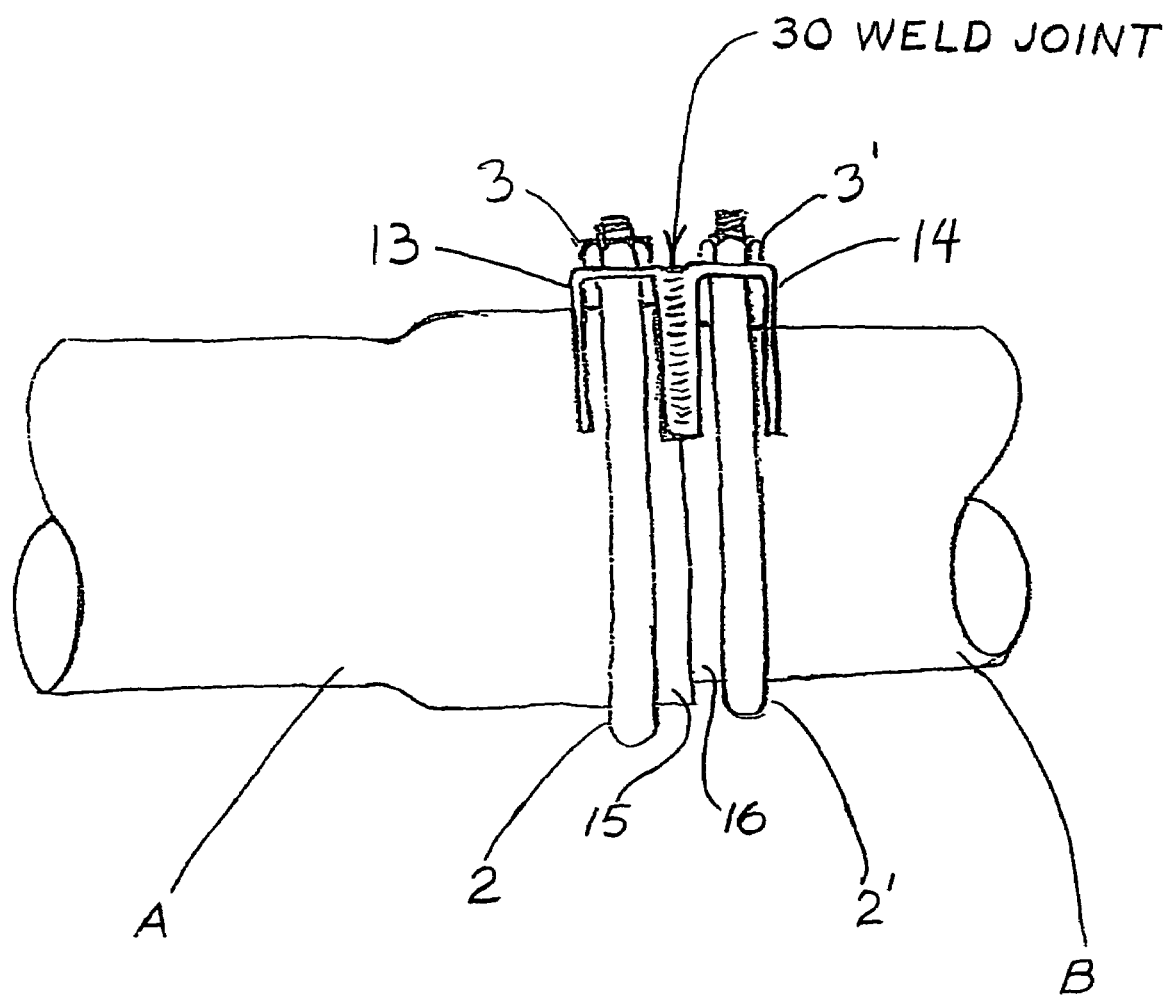
FIG. 2 is a view in elevation of the dual clamp assembly of FIG. 1 mounted over the adjacent ends of two pipes telescopically fitted into one another to form a lap joint showing the location of the welded joint between the dual clamps.

The dual clamp assembly of this invention is shown in FIGS. 1–5 and is designed to universally join together two pipes which have been telescopically fitted into one another to form a lap joint. FIG. 1 is a perspective view of the preferred embodiment of the dual clamp assembly which includes two U-shaped clamps 1 and 1' with each U shaped clamp having a U-bolt portion 2, 2' in a horseshoe like configuration having open ends 4, 4' and 5, 5' respectively and a bracket 13 and 14 hereinafter referred to as a "cradle", into which the extended open ends of the U-bolt portion is fitted. The open ends 4, 4' and 5, 5' of each U-bolt portion 2, 2' are preferably threaded and secured using threaded nuts 3 and 3' which are attached to secure each U-bolt against each cradle. Each of the U-shaped clamps 1 and 1' are intended to be placed adjacent the overlapping ends 15 and 16 of the two pipes A and B as specifically shown in FIG. 2 on opposite sides of the lap joint 20.

Each cradle 13 and 14 can be formed in a substantially identical manner from sheet steel. Cradle 13 e.g., can be formed by stamping out a curved semi-circular arc 21, and 21'(not shown) on two opposite sides 22 and 23 which extend from a base section 24. The opposite sides 22 and 23 are bent over the base section 24 into vertical alignment with one another such that each curved arc 21 and 21' face one another with the semi-circular arc 21 and 21' facing the semi-circular arc formed by the U-bolts 2 and 2' respectively. Likewise cradle 14 is formed in a similar manner with a curved arc (not shown) formed on the two opposite sides 22' and 23' which extend from a base section 24' in a manner identical to the formation of cradle 13. The curvature of each cradle 13 and 14 should be complimentary to the curvature of each U-bolt portion 2 and 2'. Openings or holes (not shown) are formed in each base section 24, 24' of the cradles 13 and 14 through which the two threaded ends 4, 4' and 5, 5' of the U bolt portions 2 and 2' are fitted before attachment of the threaded nuts 3 and 3' respectively.

The adjacent sides 23 and 23' of the base section of each cradle 13 and 14 are welded together to form a common weld joint 30 interconnecting the two clamps 1 and 1'.

The clamp 1 grips the first pipe A at a location adjacent to the lap joint 20 with the U bolt portion 2 and the semi-circular arc 21 making continuous contact over substantially the entire 360° circumference of pipe A and with the welded joint 30 located over the lap joint 20. This arrangement is considered essential to the present invention for preventing rotational slippage of each pipe relative to one another and to the clamps 1 and 1' respectively. The clamp 1' is joined to the clamp 1 through the weld joint 30, and grips pipe B at a location adjacent the lap joint 20 laterally opposite the location in which clamp 1 grips pipe A with the weld joint 30 located over the lap joint 20 between the two clamps.

Due to the weld 30 which joins the adjacent sides 23 and 23' of the cradle portion of each clamp 1 and 1' and to the construction of each clamp relatively continuous contact is made with each pipe on opposite sides of the lap joint over the entire 360° circumference of each pipe A and B. This symmetrical arrangement holds the overlapping ends of the pipes A and B in a fixed position and prevents the pipes from rotating relative to one another and from being pulled apart. Therefore it is not necessary to over tighten the nuts 3,3' which in the past, using a single clamp independent of construction, made it difficult or nearly impossible to pull the pipes A and B apart from one another without damaging or destroying the pipes. In fact using the arrangement of the present invention the degree of tightening in pounds of force to avoid over tightening can be prescribed in advance. Further, in accordance with the present invention, the resistance to pulling the pipes apart and the resistance to rotation is based upon symmetrical friction forces on opposite sides of the lap joint resulting from the continuous points of contact around each clamped pipe in a single plane along a 360° circumference of the pipes as opposed to interference forces resulting from compression of one pipe against another.

I claim:

1. A dual clamp assembly consisting of two U-shaped clamps and a welded joint autogenously interconnecting each of the U-shaped clamps forming a single unitary assembly for joining two pipes telescopically fitted into one another to form a lap joint therebetween with each of the U-shaped clamps comprising a U-bolt portion having a horseshoe configuration with open ends extending therefrom and a cradle portion having openings into which the open ends of the U bolt portion are removably fitted, and with each cradle portion of each clamp being spaced apart from one another solely by said welded joint such that each clamp is adapted to be mounted to each of the pipes on opposite sides of said lap joint with the welded joint positioned therebetween so as to prevent said pipes from being pulled apart.

2. A dual clamp assembly as defined in claim 1 wherein each cradle portion has a side adjacent to one another forming a curved cradle section with a shape complimentary to the curvature of the U-bolt portion of each clamp such that upon removably fitting the open ends of the U bolt portion into the cradle portion of each clamp over the adjacent ends of the lap joint continuous points of contact are made with each of the pipes by both the cradle portion and the U bolt portion of each clamp in a plane extending traverse of the pipes over substantially the entire 360° circumference of each pipe and with said welded joint interconnecting the two adjacent sides of each cradle portion and extending essentially the full length of each side in a vertical direction.

3. A dual clamp assembly as defined in claim 1 wherein each cradle portion is formed from a bracket having two sides in an arrangement adjacent to one another with each side having a curved semi-circular portion in a complimentary shape conforming to the curvature of the U-bolt portion of each clamp and with each semi-circular portion of each side being substantially parallel to each other, and with said welded joint interconnecting the two adjacent sides thereof and extending essentially the full length of each side in a vertical direction.

4. A dual clamp assembly as defined in claim 3 wherein said bracket further comprises a base with holes into which the open ends of the U-bolt portion of each clamp is removably fitted.

5. A dual clamp assembly as defined in claim 4 wherein said welded joint is formed between adjacent sides of each bracket.

6. A dual clamp assembly as defined in claim 4 wherein each of the open ends of each U-bolt portion of each clamp is a threaded end which extends through the holes in the base of each bracket for locking the U-bolt portion at the threaded ends against the bracket.

* * * * *

UNITED STATES PATENT AND TRADEMARK OFFICE
CERTIFICATE OF CORRECTION

| | |
|---|---|
| PATENT NO. | : 7,152,887 B2 |
| APPLICATION NO. | : 10/962114 |
| DATED | : December 26, 2006 |
| INVENTOR(S) | : Douglas Pirrone |

It is certified that error appears in the above-identified patent and that said Letters Patent is hereby corrected as shown below:

On the title page, item: (73) Assignee: should read -- DOUGLAS PIRRONE, Huntington, NY (US) --

Signed and Sealed this

Thirtieth Day of October, 2007

JON W. DUDAS
*Director of the United States Patent and Trademark Office*